Aug. 28, 1923.

C. B. KIRKHAM

AERONAUTICAL MOTOR

Filed March 26, 1917    4 Sheets-Sheet 3

1,465,989

INVENTOR
CHARLES B. KIRKHAM.

BY
ATTORNEY

Aug. 28, 1923.

C. B. KIRKHAM
AERONAUTICAL MOTOR
Filed March 26, 1917

Inventor
CHARLES B. KIRKHAM.
By
Attorney

Patented Aug. 28, 1923.

1,465,989

UNITED STATES PATENT OFFICE.

CHARLES B. KIRKHAM, OF BUFFALO, NEW YORK, ASSIGNOR TO CURTISS AEROPLANE AND MOTOR CORPORATION, A CORPORATION OF NEW YORK.

AERONAUTICAL MOTOR.

Application filed March 26, 1917. Serial No. 157,451.

*To all whom it may concern:*

Be it known that I, CHARLES B. KIRKHAM, a citizen of the United States, residing at Buffalo, in the county of Erie and State of New York, have invented certain new and useful Improvements in Aeronautical Motors, of which the following is a specification.

My invention relates to internal combustion engines of the multicylinder four-cycle type and more particularly to that class of engines which are adapted to and may be utilized for aeronautical work. It is the purpose of my invention to provide an internal combustion engine of such characteristics that it will be of comparatively light weight per useful horse power and of such simplicity of design that its utility and general operation will not be subject to complications arising from unnecessary intricacies of mechanical detail. Furthermore, my invention provides a means for operating said motor at maximum efficiency over a wide range of motor speeds and positions of throttle by reason of the novel dual arrangement of the intake manifolds relative to the valves or ports of the cylinders and their connections with the carburetors supplying the gaseous mixture.

This is accomplished by means of an engine in which is provided a set of four valves for each cylinder, two of the valves serving as intake valves and two serving as exhaust valves. The aforementioned intake valves are supplied by separate manifolds leading from a common means of carburation. The flow of gas from the carburetor is controlled by means of a throttling device which is conveniently interposed between the carburetor outlet and the intake valves of the motor. This throttling device which will hereinafter be more completely described is of such nature that it regulates the flow of gas to a degree of nicety unobtainable with any previously conceived arrangement of intake valves and manifolds. Moreover, my invention so incorporates the intake and exhaust manifolds in the general structure of the cylinders that the manifolds are surrounded at all times by the circulatory cooling agent which carries off the excess heat from the cylinder walls. This affords adequate and efficient means for maintaining the incoming gases at such a temperature that there is caused no decrease in efficiency due to vapor condensation in the manifolds. Hence is obtained an even flow of combustible gaseous vapor at all times, the amount of said flow being effectually controlled by means of the throttling device which is provided to operate in conjunction with the dual carburetor later more specifically referred to.

A still further and distinctly advantageous feature of my invention is that it provides a means for operating the dual intake and exhaust valves by means of a single cam shaft for each bank of cylinders, the cam shafts and valve mechanisms being so disposed in a containing case that they operate in a circulating bath of oil or other lubricating agent. Furthermore, the structure of the gas engine is such that the cylinder jackets cast in blocks of two contain as an integral part thereof the supports for the cam shaft bearings, the poppet valve spring seats and the valve stem guides. Interiorly, these cast jackets are threaded to receive the steel cylinder linings which carry the cylinder head as an integral part thereof. Manifolds are also cast integrally with the cylinder jackets and are themselves surrounded by the circulating cooling water.

In order to better describe and disclose the above mentioned features of my invention, the accompanying drawings wherein a multicylinder V-type engine of eight cylinders is shown are appended. However, my invention is of such nature that it is not limited to any particular number of cylinders but is adaptable to use as any multicylinder engine.

Fig. 7 is a diagrammatic illustration of the fuel feed system in part.

Figure 3:
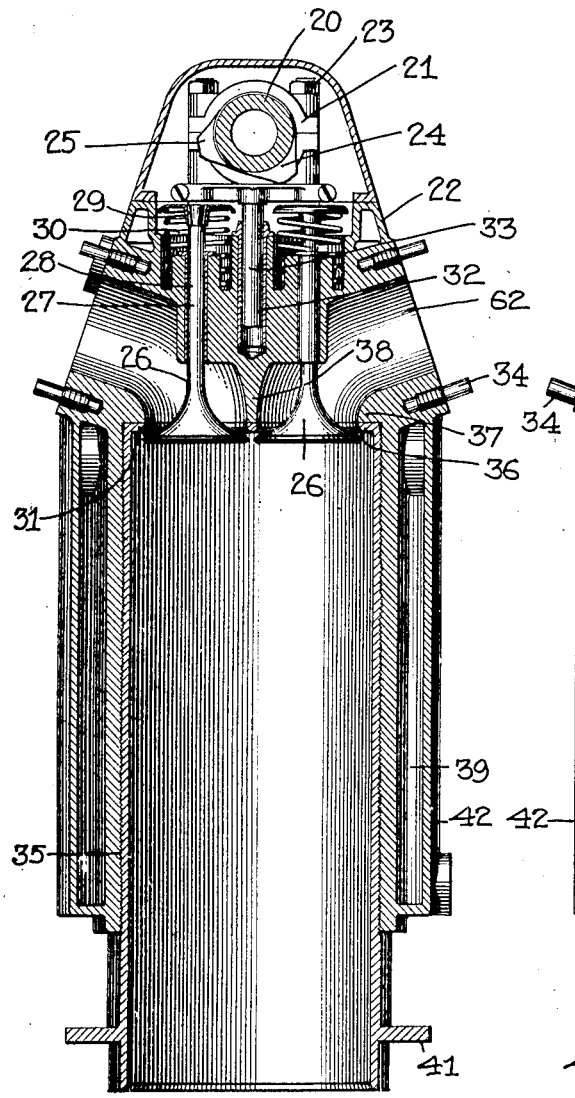
Fig. 3 is a cylinder section taken transversely, to illustrate the exhaust valve arrangement.

In Fig. 3 the hollow cam shaft 20 is shown supported by cam shaft bearings 21 held to the body of the cylinder casting wholly designated as 22 by means of studs 23. This cam shaft 20 carries a series of cams 24 and 25, (two cams per cylinder,) which serve to operate the intake and the exhaust valves. The two exhaust valves 26 have their integrally constructed stems 27 operating longitudinally within bushings 28 which are of some suitable bearing material and are inserted within the holes provided in the main cylinder casting 22. These valve stems 27 carry at their upper extremity the pressed steel caps 29 which engage the valve springs 20 and absorb the thrust therefrom, thus serving to hold the valves 26 secured against the valve seats 31.

Immediately between the two valve stem guides 28 is a sleeve 32 which serves to carry and support the T-shaped tappet rod 33. This T-headed tappet rod 33 serves as an intermediary mechanism transmitting action of the cam 24 simultaneously to the valves 26. Studs 34 carried within the upper portion of the main cylinder casting are provided for the purpose of attaching the exhaust manifolds.

The construction of the cylinders is in itself a distinct departure from the usual practice. The outer shell of the cylinder together with the exhaust manifolds, the intake manifolds and the valve retaining mechanism is cast in one piece preferably of aluminum. Within the bore of this casting, the entire longitudinal extent having been threaded, a steel cylinder lining 35 is inserted. This steel cylinder lining carries as an integral part thereof a steel head portion 36 which serves to function as the valve seats for the poppet valves and the cylinder wall portion 35. In order that the blocks and cylinders may be attached readily to the crank case of the motor, the steel cylinder wall portions 35 are extended to a point somewhat below the outer casing 22 and have integrally formed thereon flanges 41, the flanges 41 being adapted to receive bolts or studs carried by the crank case proper. This construction provides a cylinder of great lightness but possessing ample strength since the steel cylinder head lining 36 is in contact with the case aluminum webbing 37, 38 at all points of its upper surface. The water jacket spaces 39 completely surround the cylinders 35 and afford passage way for the circulatory cooling agent.

Figure 1:
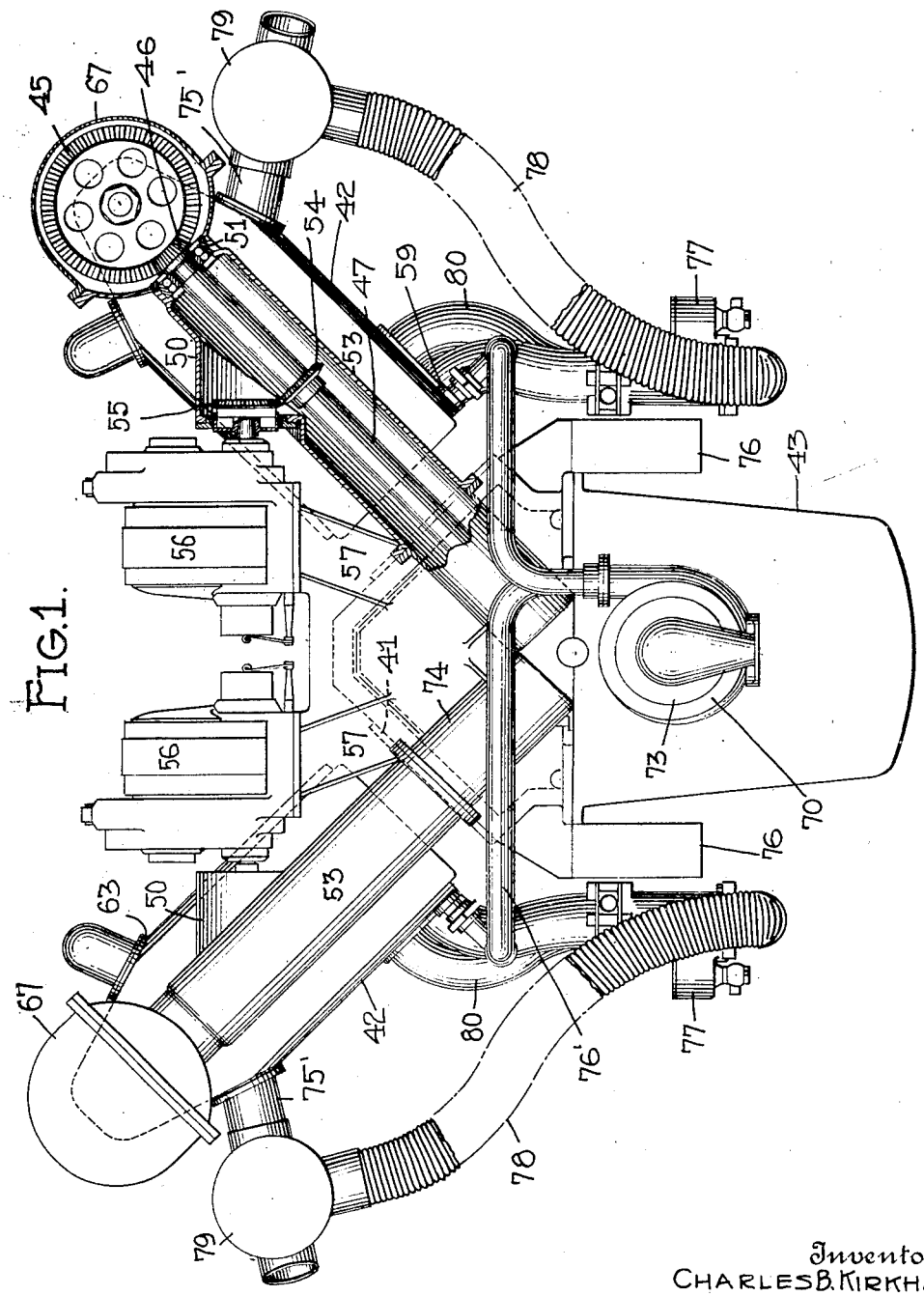
Fig. 1 is an end elevation of the motor.
Figure 2:
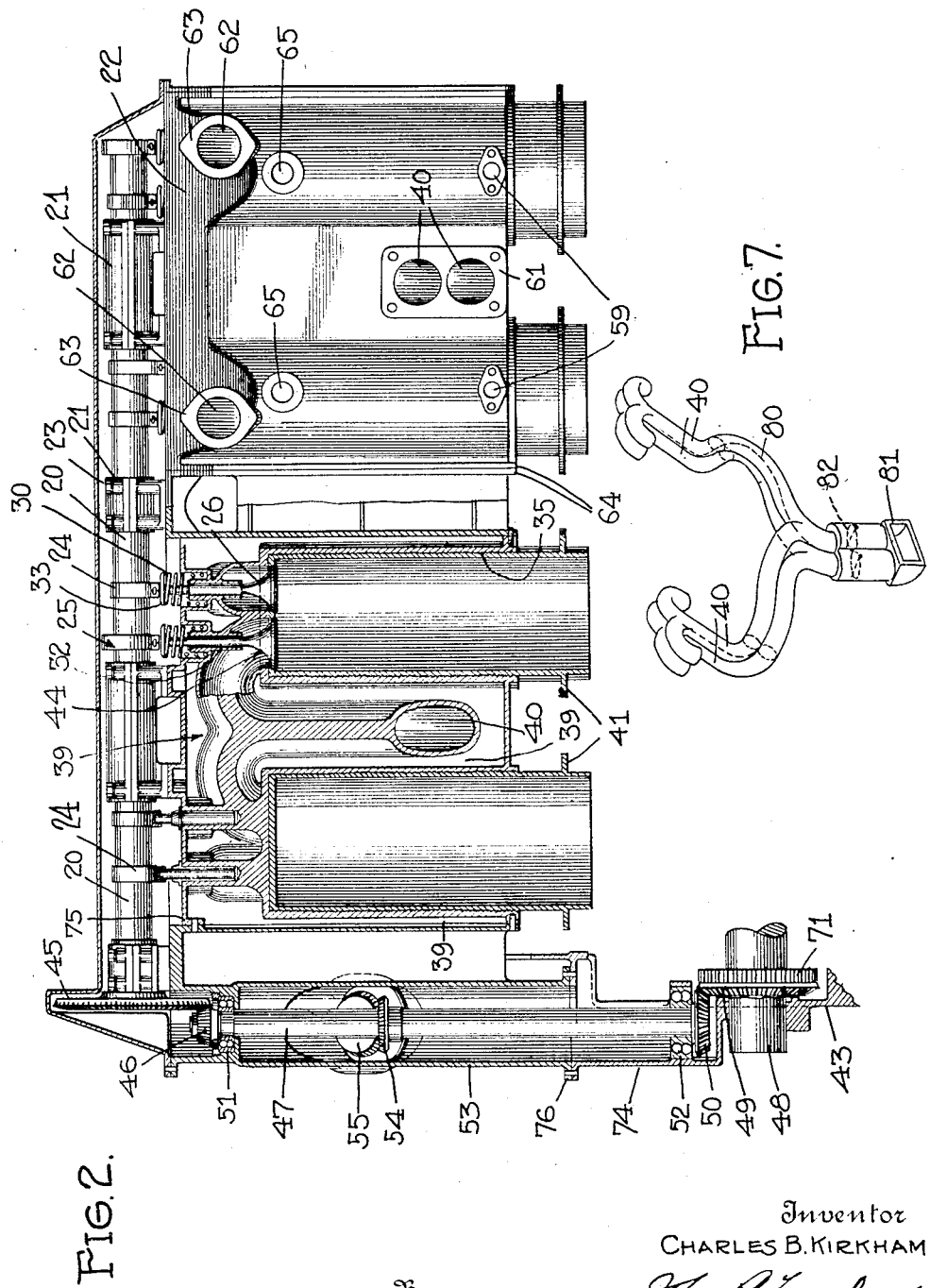
Fig. 2 is a side elevation of one cylinder bank, a part thereof being shown in section.
Figure 4:
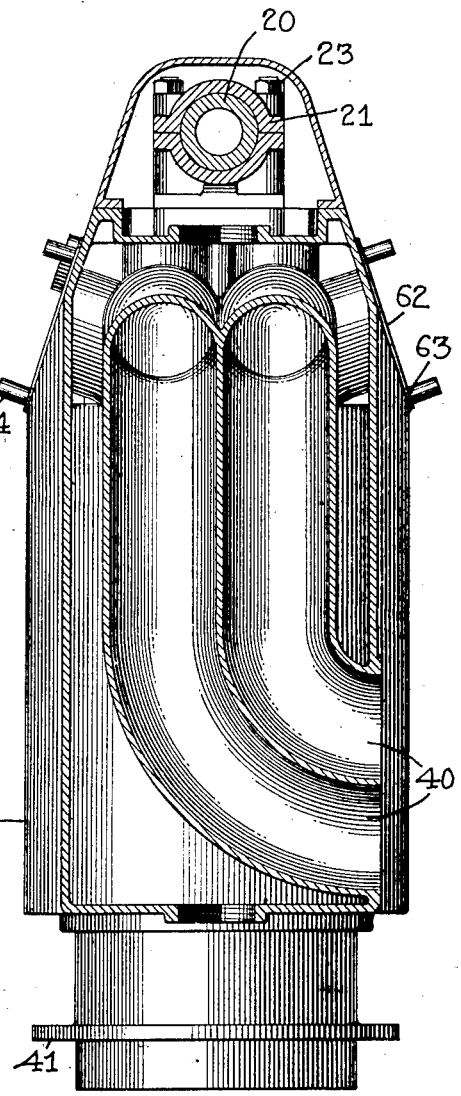
Fig. 4 is a sectional view similarly taken, to illustrate the disposition of the intake manifolds.

In Figs. 2 and 4 the integrally cast dual intake manifolds 40 are shown. These manifolds are arranged to lead up between the pairs of cylinders where they are branched out longitudinally of the motor in order to supply the cylinders, one main pair of manifolds thus functioning to supply two cylinders. In Fig. 2 the intake poppet valves to which these manifolds lead are designated 44. It will also be noticed that the dual intake manifolds 40 are completely surrounded by the circulatory cooling agent whereby any condensation of the combustible vapor is prevented since the manifold is maintained at an even and uniform temperature at all times by reason of its contact with the cooling water. Thus it is seen that the gas enters the cylinders through the valves 44 with the uniform flow of an even temperature which is highly conducive to the most efficient motor operation. The operation of the intake valves 44 by means of the cam shaft 20 and the cam 25 is the same in every detail as that of the exhaust valves 26 above described. The cam shaft 20 is driven by means of the bevel gear 45 which meshes with a second bevel gear 46 carried at the upper extremity of the radial divergent shaft 47. The shaft 47 is driven directly from the crank shaft 48 by means of the bevel gears 49 and 50 and is supported by means of the bearings 51 and 52. The bearing 51 is cast as an integral part of the shaft casing or housing 53 shown in Fig. 2. The bearing 52 is formed as an integral part of the crank case wholly designated as 43. At a point intermediate the upper and lower extremities of the shaft 47 a bevel gear 54 is placed. This gear 54 is adapted to engage directly with a gear 55 which is directly attached to the shaft of the magneto 56 as clearly shown in Fig. 1.

Figure 5:
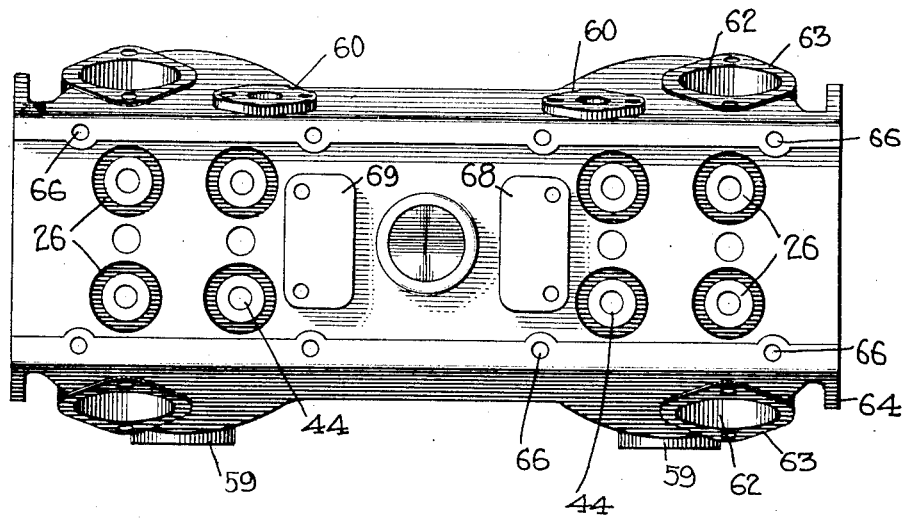
Fig. 5 is a plan view of a cylinder block showing the location of the valves.

The two magnetos 56 are located within the V formed between the banks of cylinders and are carried upon supporting brackets 57 which are attached to the crank case in any suitable manner. The inlet orifices which serve to admit the flow of cooling water are designated as 59 in Figs. 2 and 5 are similarly the outlet orifices are designated as 60. Connection to the intake manifolds 40 is established by means of a suitable flange coupling which bears upon the integrally cast coupling plate 61 (Fig. 2). The exhaust manifolds 62 are provided with a similar cast coupling 63 in order that the exhaust conduit 75 (Fig. 1) may be attached thereto.

Figure 6:
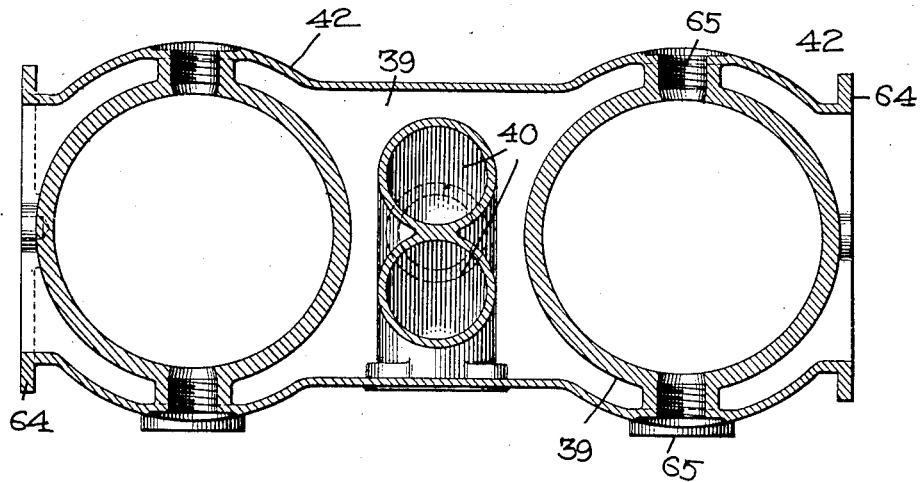
Fig. 6 is a horizontal section showing a pair of cylinder intake manifolds.

Fig. 5 is a plan view of a pair of cast cylinder jackets in which is disclosed the disposition of the intake valves 44 and the exhaust valves 26 relative to the cylinder jacket cast. The blocks of cylinders which constitute the requisite number per bank are securely fastened together by means of the flanges 64 which are connected by means of suitable bolts or studs. Fig. 6 is a horizontal section through a cylinder jacket unit in which the disposition of the dual intake manifold relative to the cylinders is shown. The diametrically opposite threaded openings 65 are for the purpose of receiving the ignition blocks, two per cylinder, and are disposed laterally with regard to the general structure of the motor. The holes 66 which are formed in the top of the main cylinder casting are provided for the purpose of receiving bolts which hold the upper portion 67 of the valve mechanism housing in position as shown in Fig. 1. The location of the cam shaft bearing bases 68 and 69 is clearly shown in Fig. 5, these bases being preferably cast as an integral part of the main cylinder casting.

Referring to Fig. 1, the general arrangement of the various component parts may be clearly seen. The cooling water circulating pump 70 is disposed in a suitable manner at one end of the crank case wholly designated as 43 and is driven directly from the crank shaft 48 by means of a gear 71 (Fig. 2) which is carried by the crank shaft and engages a gear 73 (Fig. 1) disposed upon the shaft of the pump 70. From the circulating pump 70 the water piping 76' leads to the water inlet orifices 59. Carried at either side of the engine bed supports 76 and disposed at a point approximately on a line with the crank shaft of the motor are the two duplex carburetors 77. The air intake for these carburetors 78 leads preferably from an air heater 79 which is disposed about the exhaust conduits 75. The carbureted gas is taken from the carburetor outlet to the mouth of the intake manifold 40 by means of suitable conduits 80 which connect by suitable bolts or studs to the integrally formed connecting plate 61 as pointed out in Fig. 2.

The operation of these duplex carburetors and the throttling arrangement interposed between the carburetors and the manifolds of the motor cylinders is such that the distribution of gas may be controlled to so accurate a degree that maximum efficiency may be obtained from the motor throughout a wide range of motor speeds by admitting gas, for instance at half load through only one of the intake manifolds whereby the carburetor supplying this manifold operates at maximum efficiency and the manifold conducts and distributes the gas at the best possible advantage. In case of full speed operation it is obvious that both carburetors and both of the dual intake manifolds will be operating at capacity. This system of gas supply is illustrated diagrammatically in Fig. 7 wherein a single duplex carburetor is shown coupled up with the separate conduits which feed the cylinders in pairs. Said carburetor is designated as 81 and may be replaced by separate carburetors interconnected. Moreover, the valves 82 indicated by dotted lines are movable under the condition set forth in a copending application, Serial No. 151512, filed February 28, 1917, since the movement thus outlined is successive and especially desirable in that the fuel supply to the several cylinders via one of the separate conduits is either completely cut off or wide open before even the slightest change in the operating condition of the other conduit occurs. In other words it is the aim of this invention broadly to provide a means for controlling the fuel supply to the cylinder or cylinders of an internal combustion engine which comprises a plural number of conduits arranged to separately feed said cylinder or cylinders together with means for regulating the supply of fuel by opening or closing said conduits successively.

Although I have described a preferred embodiment of my invention, it is to be understood that I do not limit myself to any particular materials or construction which might be used to accomplish the same end. An interpretation of my invention should only be made in the light of the subjoined claims.

What is claimed is:

1. In an internal combustion engine, a plural member of cylinders arranged in bank and having a water jacket, each cylinder having an exhaust port and a plural number of intake ports for exhausting spent gas and admitting fuel gas respectively therefrom and thereto, and separate fuel supply conduits arranged between cylinders, said conduits having substantial portions parallelly arranged with reference to said cylinders and wholly contained within and passing thru said water jacket for supplying fuel gas to the corresponding intake ports of the cylinders between which said conduits are arranged.

2. In an internal combustion engine, the combination of a cylinder having an exhaust port and two or more intake ports formed therein for exhausting spent gas and admitting fuel gas respectively therefrom and thereto, means jacketing said cylinder, a pair of carbureters and separate fuel supply conduits for said intake ports jacketed commonly with said cylinder and leading to said carbureters, said supply conduits having substantial portions which are parallelly arranged with reference to said cylinders and are wholly contained within the jackets.

3. In an internal combustion engine, the combination of a plural number of cylinders each having a plural number of intake ports and an exhaust port formed therein to admit fuel gas and exhaust spent gas respectively thereto and therefrom, means commonly jacketing said cylinders, a pair of carbureters and separate fuel supply conduits for the corresponding intake ports of adjacent cylinders commonly jacketed therewith, and leading to said carbureters, said conduits having substantial portions which are parallelly arranged with reference to said cylinders and are wholly contained within the cylinder jackets.

4. In an internal combustion engine, in combination, a plurality of cylinder blocks, each of said blocks comprising two cylinders formed of one piece and having an integral common intake manifold extended vertically therebetween throughout the major portion of the length of the cylinder blocks, a cylinder water jacket completely enclosing that portion of the intake manifold between adjacent cylinders, means for fastening the cylinder blocks together, and means for supplying the intake with fuel.

5. In an internal combustion engine, a bank of cylinders comprising a plurality of blocks, each block comprising two cylinders formed into a unitary structure and having a pair of common intakes disposed therebetween, means for bridging and fastening said blocks together to form a bank and means for regulating and admitting fuel to said cylinders thru said common intakes.

6. In an internal combustion engine, a cylinder casting comprising a pair of adjacent integrally formed jacket casings and an intake manifold disposed within the chamber formed between said adjacent jackets and parallelly arranged with reference thereto, said manifold being formed in one piece with said casings and having branches leading thru adjacent jackets.

7. In an internal combustion engine, a unitary cylinder casting comprising a pair of adjacent internally threaded jacket casings, said jacket casings being enclosed by an outer casing and an integrally formed intake manifold having substantial portions extending upwardly thru said chamber provided between said threaded casings and wholly contained within said chamber.

8. In an internal combustion engine, a cylinder casting comprising a pair of adjacent jacket casings, said casings being internally threaded, an outer casing enclosing the longitudinal sides of said casting, and a pair of intake manifolds extending upwardly and disposed within the chamber formed between said adjacent casings, said outer casing having a securing flange formed on the ends thereof for attachment to a closing plate.

9. In an internal combustion engine, a bank of cylinders comprising two or more blocks, each block comprising two cylinders formed into a single piece, each block having means for attachment to the adjacent block and to an end closing plate, and an end closing plate and gear housing attachable to one end of said bank.

10. In an internal combustion engine, a cylinder block comprising a pair of adjacently disposed cylinders, each of said cylinders having a pair of intake valves disposed therein, said cylinders also having disposed therebetween a pair of intake manifolds leading upwardly to said intake valves and each of said manifolds being T-shaped at its upper end and having its branches lead to intake valves in the adjacent cylinders.

In testimony whereof I hereunto affix my signature.

CHARLES B. KIRKHAM.